United States Patent
Wen (10) Patent No.: US 12,514,565 B2
(45) Date of Patent: Jan. 6, 2026

(54) METHOD FOR DETERMINING VETERINARY ULTRASOUND EXAMINATION CONDITION, AND ULTRASOUND IMAGING APPARATUS

(71) Applicant: Shenzhen Mindray Animal Medical Technology Co., Ltd., Shenzhen (CN)

(72) Inventor: Bo Wen, Shenzhen (CN)

(73) Assignee: Shenzhen Mindray Animal Medical Technology Co., Ltd., Shenzhen (CN)

( * ) Notice: Subject to any disclaimer, the term of this patent is extended or adjusted under 35 U.S.C. 154(b) by 209 days.

(21) Appl. No.: 18/081,438

(22) Filed: Dec. 14, 2022

(65) Prior Publication Data
US 2023/0120268 A1    Apr. 20, 2023

Related U.S. Application Data

(63) Continuation of application No. PCT/CN2020/141704, filed on Dec. 30, 2020.

(51) Int. Cl.
*A61B 8/00* (2006.01)
*G16H 20/30* (2018.01)
*G16H 10/20* (2018.01)

(52) U.S. Cl.
CPC .......... *A61B 8/54* (2013.01); *A61B 8/461* (2013.01); *A61B 8/467* (2013.01); *G16H 20/30* (2018.01); *A61B 2503/40* (2013.01); *G16H 10/20* (2018.01)

(58) Field of Classification Search
CPC .......... A61B 8/54; A61B 8/461; A61B 8/467; A61B 2503/40; A61B 8/08; A61B 8/4245;
(Continued)

(56) References Cited

U.S. PATENT DOCUMENTS

| 6,258,028 B1 | 7/2001 | Byeon et al. |
| 2012/0226161 A1 | 9/2012 | Pelissier et al. |

(Continued)

FOREIGN PATENT DOCUMENTS

| CN | 106963421 A | * | 7/2017 | ........... A61B 8/4444 |
| CN | 109953772 A | | 7/2019 | |

(Continued)

*Primary Examiner* — Kaitlyn E Sebastian
(74) *Attorney, Agent, or Firm* — Kory D. Christensen (57) ABSTRACT

The disclosure relates to a method for determining a veterinary ultrasound examination condition, and an ultrasound imaging apparatus. The method includes: obtaining animal information of an animal to be tested, wherein the animal information includes an animal type and/or an examination type; determining currently available probes and supported examination modes; and determining, based on the animal information and historical usage data of the available probes, a target probe and a target examination mode for examining the animal to be tested from the available probes and the supported examination modes. According to the disclosure, the probe for examining the animal to be tested can be automatically determined, such that repetitive work of a user can be reduced, and a suitable probe for examination can be quickly obtained, thereby improving examination efficiency of veterinary ultrasound examination, and ensuring examination effect.

11 Claims, 4 Drawing Sheets

(58) Field of Classification Search
CPC ...... A61B 8/4444; G16H 20/30; G16H 10/20; A61D 99/00
See application file for complete search history.

(56) References Cited

U.S. PATENT DOCUMENTS

| | | | | |
|---|---|---|---|---|
| 2013/0226001 | A1* | 8/2013 | Steen | G01S 7/52096 600/447 |
| 2016/0262726 | A1* | 9/2016 | Yoon | A61B 8/463 |
| 2017/0071570 | A1* | 3/2017 | Jumatsu | A61B 8/4405 |
| 2019/0261956 | A1* | 8/2019 | Srinivasan | G01S 7/003 |

FOREIGN PATENT DOCUMENTS

| | | | |
|---|---|---|---|
| CN | 111317501 A | * | 6/2020 |
| DE | 202015103601 U1 | | 8/2015 |
| WO | 2020024255 A1 | | 2/2020 |

\* cited by examiner

METHOD FOR DETERMINING VETERINARY ULTRASOUND EXAMINATION CONDITION, AND ULTRASOUND IMAGING APPARATUS

CROSS-REFERENCE TO RELATED APPLICATIONS

This application is a continuation of International Application No. PCT/CN2020/141704, filed on Dec. 30, 2020, which is incorporated herein by reference in its entirety.

TECHNICAL FIELD

The present disclosure generally relates to the field of medical technologies and, more specifically, to veterinary ultrasound examination technologies.

BACKGROUND

In recent years, with the continuous development of ultrasound examination technologies and an increasing number of veterinary clinical diagnostic methods, ultrasound examination technologies are widely applied in animal examination, animal reproduction and obstetrics, and animal husbandry production. Currently, objects for veterinary ultrasound examination may already include animals of various sizes, including large animals, such as cattle, sheep and deer, and small animals, such as cats, dogs and rabbits. For different types of animals, which greatly vary in terms of body sizes, structures, etc., conditions, such as images and applications for ultrasound examination, are also different. Switching probes and examination modes is a frequent operation for doctors and needs to be performed once during almost every examination, even during the same type of examination, to reset an adjusted image parameter. Conventional veterinary ultrasound imaging apparatuses still require doctors to manually switch examination conditions.

Manual switching by doctors is a repetitive movement, which may increase interaction between doctors and apparatuses and may increase time costs especially in the case of a large quantity of examinations. In addition, due to the inconvenience of switching, doctors may switch as few probes as possible, resulting in probes being used that not the most suitable probes for the current examination. As a result, obtained ultrasound images have a reduced effect. When doctors are not familiar with operating characteristics of ultrasound imaging apparatuses, the doctors may fail to select the most suitable probe and examination mode for an object under examination at a time, which may also reduce the efficiency of the ultrasound examination.

SUMMARY

Embodiments of the disclosure provide a method for determining a veterinary ultrasound examination condition, and an ultrasound imaging apparatus, to solve at least one of the above problems of reduced effect of ultrasound images and efficiency of ultrasound examination, etc. due to repeated manual switching of probes and examination modes and inconvenient operation.

According to one aspect of the embodiments of the disclosure, a method for determining a veterinary ultrasound examination condition is provided. The method includes:
obtaining animal information of an animal to be tested, wherein the animal information includes an animal type and/or an examination type;
determining currently available probes and examination modes that supported by each of the available probes; and
determining, based on the animal information and historical usage data of the available probes, a target probe for examining the animal to be tested are determined from the available probes and a target examination mode for examining the animal to be tested are determined from examination modes that supported by each of the available probes.

Optionally, the animal information further includes an animal weight and/or an animal age.

Optionally, obtaining animal information of an animal to be tested includes obtaining the animal information from user input information and/or case data information.

Optionally, determining currently available probes and examination modes that supported by each of the available probe includes:
detecting current connection statuses of all probes and determining probes that have been connected as the available probes; and
obtaining the examination modes that supported by each of the available probes based on a preset mapping relationship between probes and examination modes.

Optionally, the method further includes collecting statistics on at least one of a usage frequency, a total number of usage times, and a total usage duration of each of the examination modes supported by each of the probes, to obtain historical usage data of each of the probes.

Optionally, determining, based on the animal information and historical usage data of the available probes, a target probe for examining the animal to be tested are determined from the available probes and a target examination mode for examining the animal to be tested are determined from examination modes that supported by each of the available probes includes:
determining candidate target probes based on the animal information; and
selecting, from examination modes supported by the candidate target probes, an examination mode with the highest usage frequency, the largest total number of usage times or the longest total usage duration as the target examination mode, wherein a candidate target probe corresponding to the target examination mode is the target probe; or
calculating, based on weights of at least two of a usage frequency, a total number of usage times and a total usage duration, scores of examination modes supported by the candidate target probes, and using an examination mode with the highest score as the target examination mode, wherein a candidate target probe corresponding to the target examination mode is the target probe.

Optionally, determining, based on the animal information and historical usage data of the available probes, a target probe for examining the animal to be tested are determined from the available probes and a target examination mode for examining the animal to be tested are determined from examination modes that supported by each of the available probes includes:
determining the target examination mode based on the animal information; and
selecting, from the available probes that support the target examination mode, an available probe with the highest usage frequency, the largest total number of usage times or the longest total usage duration as the target probe; or calculating, based on weights of at least two of a usage frequency, a total number of usage times and a total usage duration, scores of the available probes that support the target examination mode, and using an available probe with the highest score as the target probe.

Optionally, determining, based on the animal information and historical usage data of the available probes, a target probe for examining the animal to be tested are determined from the available probes and a target examination mode for examining the animal to be tested are determined from examination modes that supported by each of the available probes includes:

determining the target examination mode based on the animal information;

using available probes that have appeared in the historical usage data of the available probes and support the target examination mode as candidate target probes;

receiving a first user instruction; and determining the target probe from the candidate target probes in response to the first user instruction.

Optionally, the method further includes displaying a recently used list, which includes at least one combined identifier arranged according to a usage time, wherein each combined identifier includes a corresponding probe identifier and an animal type and examination mode identifier.

Optionally, the method further includes:

selecting an animal type and an examination mode identifier from a combined identifier, and displaying, in an association manner, a probe identifier of another available probe that supports the selected animal type and examination mode; or selecting a probe identifier from a combined identifier, and displaying, in an association manner, a probe identifier of another available probe that supports an animal type and an examination mode in the combined identifier that correspond to the selected probe identifier, wherein when the probe identifier of the another available probe is selected, the another available probe is used as a new target probe to examine the animal to be tested.

Optionally, the method further includes controlling the target probe to perform ultrasound scanning on the animal to be tested under the target examination mode.

According to another aspect of the embodiments of the disclosure, a method for determining a veterinary ultrasound examination condition is provided. The method includes:

obtaining animal information of an animal to be tested, wherein the animal information includes an examination type;

determining currently available probes and supported examination modes; and determining, based on the animal information, a target probe for examining the animal to be tested are determined from the available probes and a target examination mode for examining the animal to be tested are determined from examination modes that supported by each of the available probes.

Optionally, determining, based on the animal information, a target probe for examining the animal to be tested are determined from the available probes and a target examination mode for examining the animal to be tested from examination modes that supported by each of the available probes includes:

determining the target examination mode based on the examination type;

using available probes that support the target examination mode as candidate target probes;

receiving a second user instruction; and determining the target probe from the candidate target probes in response to the second user instruction.

Optionally, the animal information further includes an animal type, and using available probes that support the target examination mode as candidate target probes further includes using available probes that match the animal type in the available probes that support the target examination mode, as the candidate target probes.

Optionally, the method further includes controlling the target probe to perform ultrasound scanning on the animal to be tested under the target examination mode.

According to yet another aspect of the embodiments of the disclosure, an ultrasound imaging apparatus is provided. The ultrasound imaging apparatus includes:

an ultrasonic probe;

a transmitting/receiving control circuit configured to control the ultrasonic probe to transmit an ultrasonic wave to an animal to be tested and receive an echo of the ultrasonic wave, to obtain an ultrasonic echo signal;

a human-machine interaction device configured to output visual information and receive a user input; and a processor configured to perform the methods described above.

According to the method for determining a veterinary ultrasound examination condition, and the ultrasound imaging apparatus in the embodiments of the disclosure, in combination with information of the currently available probes of the ultrasound imaging apparatus and the animal information of the animal to be tested, the probe for examining the animal to be tested is automatically determined, such that repetitive work of a user can be reduced, and a suitable probe for examination can be quickly obtained, thereby improving the examination efficiency of veterinary ultrasound examination, and ensuring the examination effect.

BRIEF DESCRIPTION OF THE DRAWINGS

In order to more clearly describe the technical solutions in the embodiments of the disclosure or in the prior art, the drawings required for describing the embodiments or the prior art will be briefly described below. Apparently, the drawings in the following description show only some of the embodiments of the disclosure, and those of ordinary skill in the art may still derive other drawings from these drawings without creative efforts.

DETAILED DESCRIPTION

The technical solutions of the embodiments of the disclosure will be described below clearly and comprehensively in conjunction with accompanying drawings of the embodiments of the disclosure. The embodiments described are merely some of, rather than all of, the embodiments of the disclosure. All other embodiments obtained by persons of ordinary skill in the art based on the embodiments of the disclosure without creative efforts shall fall within the scope of protection of the disclosure.

Figure 1:
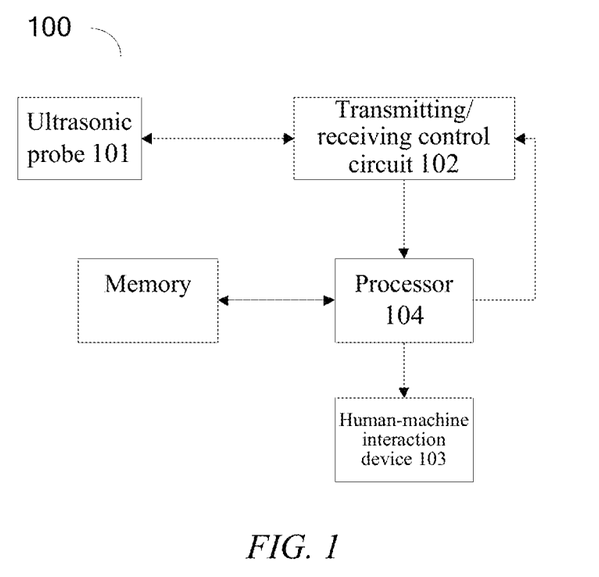
FIG. 1 is a schematic structural block diagram of an ultrasound imaging apparatus according to an embodiment of the disclosure.

FIG. 1 is a schematic structural block diagram of an ultrasound imaging apparatus according to an embodiment of the disclosure. Referring to FIG. 1, an ultrasound imaging apparatus 100 may include:

an ultrasonic probe 101, a transmitting/receiving control circuit 102, a human-machine interaction device 103, and a processor 104. The transmitting/receiving control circuit 102 controls the ultrasonic probe 101 to transmit an ultrasonic wave to an animal to be tested and receive an echo of the ultrasonic wave, to obtain an ultrasonic echo signal. The human-machine interaction device 103 is configured to output visual information and receive a user input. The processor 104 is configured to perform some or all of the steps or any combination of the steps in the method for determining a veterinary ultrasound examination condition in the embodiments of the disclosure.

Optionally, the processor 104 further processes the ultrasonic echo signal/data to obtain an ultrasound image of a target object.

In some embodiments, the processor 104 may be implemented by software, hardware, firmware or a combination thereof, and may be at least one of a circuit, one or more application specific integrated circuits (ASIC), a digital signal processor (DSP), a digital signal processing device (DSPD), a programmable logic device (PLD), a field programmable gate array (FPGA), a central processing unit (CPU), a controller, a microcontroller and a microprocessor, such that the processor 104 may further perform some or all of the steps or any combination of the steps in the method for determining a veterinary ultrasound examination condition in the embodiments of the disclosure.

Optionally, the ultrasonic probe 101 may include a transducer. The transducer is configured to receive an instruction of the transmitting/receiving control circuit 102, to transmit an ultrasonic wave and/or receive an ultrasonic echo.

In some embodiments, the ultrasonic probe 101 may include at least one of the following types: a linear array probe, a convex array probe, a micro-convex array probe, and a cavity probe.

Optionally, the human-machine interaction device 103 may include a display that may be configured to display visual information to a user. Further, the human-machine interaction device may further include an input device for input by a user, such as a mouse or a keyboard.

In some embodiments, the display may be a touch display screen, a liquid crystal display screen, etc., or may be an independent display apparatus, such as a liquid crystal display or a television, independent of the ultrasound imaging apparatus 100, or may be a display screen on an electronic apparatus, such as a mobile phone and a tablet computer.

When the ultrasound imaging apparatus 100 according to this embodiment of the disclosure is running, the human-machine interaction device 103 may provide a corresponding operation interface for an operator to operate. The operation interface may include a control corresponding to each section group, such as an identifier box or a menu bar, so that the operator may input an operation instruction on the operation interface according to actual usage, to perform ultrasound imaging by the ultrasound imaging apparatus 100 or implement the determination of a veterinary ultrasound examination condition.

Optionally, the ultrasound imaging apparatus 100 may further include a memory that may be configured to store any data and instruction generated by the ultrasound imaging apparatus 100. In some embodiments, the memory may be a volatile memory, such as a random access memory (RAM), or a non-volatile memory, such as a read-only memory (ROM), a flash memory, a hard disk drive (HDD), or a solid-state drive (SSD), or a combination of the above types of memories, and provide instructions and data to the processor.

An embodiment of the disclosure further provides a computer-readable storage medium, which stores a plurality of program instructions. After the plurality of program instructions are invoked and executed by the processor 104, some or all of the steps or any combination of the steps in the method for determining a veterinary ultrasound examination condition in the embodiments of the disclosure may be performed.

Figure 2:
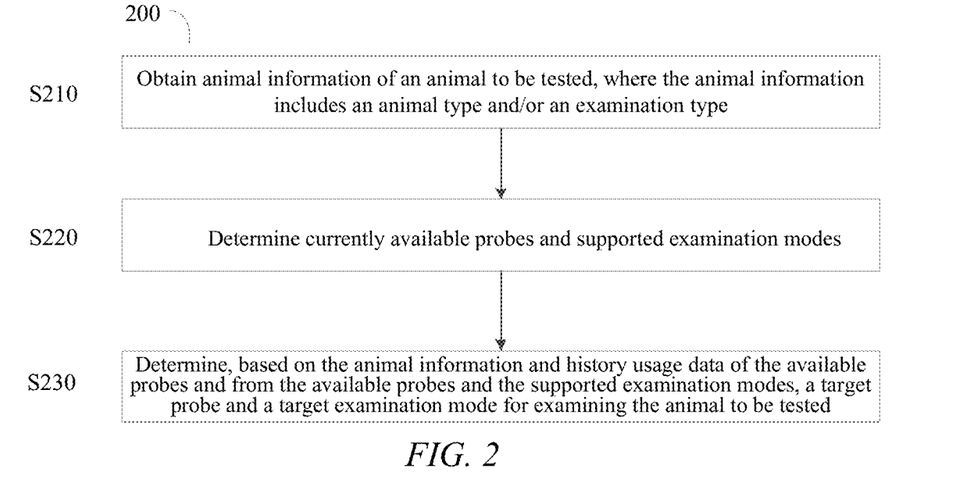
FIG. 2 is a schematic flowchart of a method for determining a veterinary ultrasound examination condition according to an embodiment of the disclosure.

FIG. 2 is a schematic flowchart of a method for determining a veterinary ultrasound examination condition according to an embodiment of the disclosure. As shown in FIG. 2, the method 200 for determining a veterinary ultrasound examination condition provided in this embodiment of the disclosure includes:

step S210 of obtaining animal information of an animal to be tested, wherein the animal information includes an animal type and/or an examination type;

step S220 of determining currently available probes and supported examination modes; and step S230 of determining, based on the animal information and historical usage data of the available probes, a target probe for examining the animal to be tested are determined from the available probes and a target examination mode for examining the animal to be tested are determined from examination modes that supported by each of the available probes.

The veterinary ultrasound examination condition may be an ultrasound examination parameter used in ultrasound examination of an animal to be tested, for example, a probe used and an examination mode therefor. The animal type may be a category of an animal, such as cat or dog. The examination type may refer to an organ under examination, such as abdomen, reproductive organ, heart, blood vessel, or small organ. In combination with the animal information of the animal to be tested, the currently available probes and the supported examination modes and the historical usage data of the probes, a suitable target probe and a target examination mode can be automatically determined to examine the animal to be tested. Compared with conventional veterinary ultrasound examination methods that require manual switching of a probe and a corresponding examination mode, the method according to the embodiments of the disclosure makes it possible that the determined probe and examination mode can well adapt to user habits or industry customs, repetitive work of a user can be reduced, and a suitable probe for examination can be quickly obtained, thereby improving the examination efficiency of veterinary ultrasound examination and ensuring the examination effect. The method is widely applicable to various veterinary ultrasound examination occasions.

It should be understood that steps S210 and S220 may be performed synchronously, or may be performed asynchronously, and step S220 may also be completed before step S210. The sequence of steps S210 and S220 is not limited herein.

In some embodiments, determining the target probe includes determining a model or an ID number of the target probe.

In some embodiments, the animal information further includes an animal weight and/or an animal age.

Optionally, in step S210, obtaining animal information of an animal to be tested includes: obtaining the animal information from user input information and/or case data information.

Figure 3:
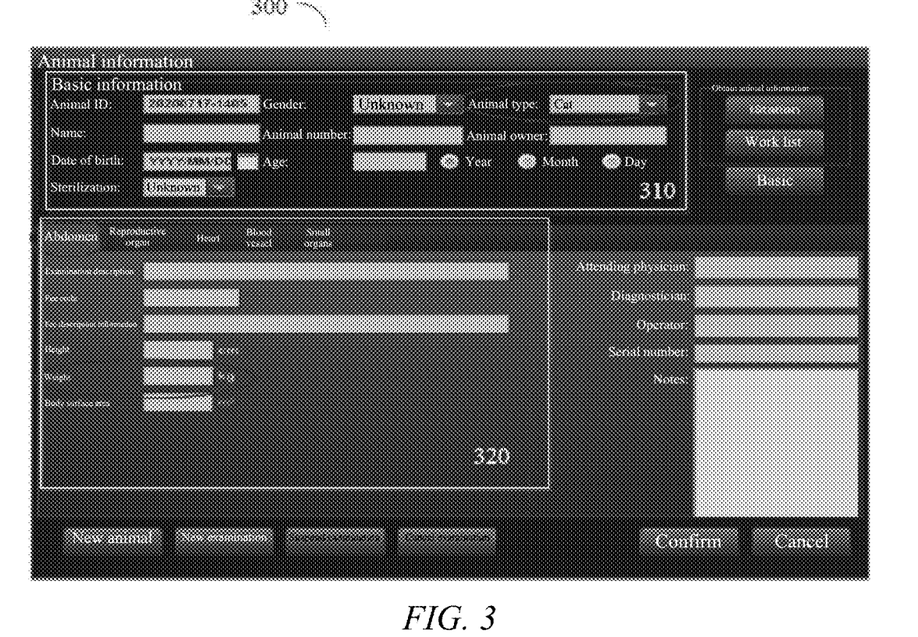
FIGS. 3 and 4 are examples of interfaces for user to input information according to an embodiment of the disclosure.
Figure 4:
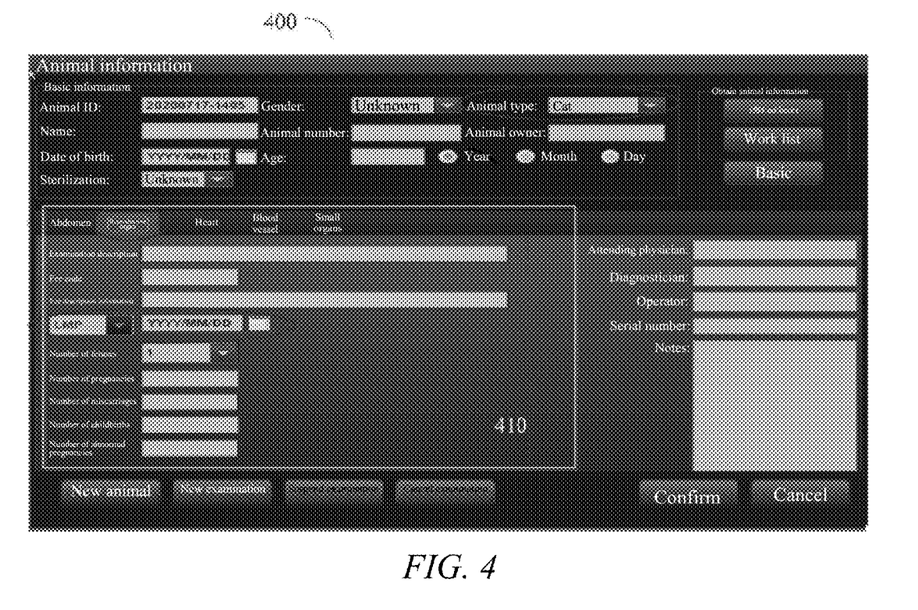

In some embodiments, obtaining the animal information from user input information may be performed based on a human-machine interaction device. Specifically, referring to FIGS. 3 and 4, FIGS. 3 and 4 show examples of interfaces for a user to input information according to an embodiment of the disclosure. As shown in FIGS. 3 and 4, the human-machine interaction device may provide a corresponding operation interface to a user through a display device (such as a computer). The operation interface 300 may include at least one animal information identifier and a corresponding input area. The user may manually input at least one piece of animal information in at least one corresponding input area through an input device (such as a mouse, a keyboard, or a touch screen), the animal information including: basic information 310, such as animal ID, gender, animal type, name, animal number, animal owner name, date of birth, age, and sterilization status, etc.; an examination type 320, such as abdomen, reproductive organ, heart, blood vessel, and small organ. Further, on a sub-page of the examination type, animal information related to the examination type may be further included. Other information required for the examination type may be inputted. As shown in FIG. 3, on a sub-page of an abdominal examination, information such as height and weight may be further inputted. As shown in FIG. 4, on a sub-page 410 of a reproductive examination on the operation interface 400, information such as a number of pregnancies, a number of abortions, and a number of parturitions may be further inputted. After the user inputs the animal information of the animal to be tested and triggers a preset identifier (for example, clicks on Confirm), the processor obtains the user input information. Further, upon detecting that the user gives an input in an input area, the processor may automatically obtain, through an obtaining module, the animal information input by the user in the input area. Further, the processor may store the user input information in a memory.

In some embodiments, the case data information may be pre-stored animal information of the animal to be tested. For example, when diagnosing the animal to be tested, a doctor determines that ultrasound examination is to be performed on the animal to be tested, and records an animal type and diagnosis information in a medical data system. The diagnosis information may include symptom information of the animal to be tested, an examination type, etc., which may be stored in a memory associated with the medical data system. When the animal to be tested undergoes this type of examination, the animal type and the examination type recorded in advance can be directly obtained from the medical data system, to obtain the animal information of the animal to be tested.

In some embodiments, the case data information may be historical case data. For example, current ultrasound examination may be reexamination of the animal to be tested. Prior to this, a same type of ultrasound examination has been performed and the animal information of the animal to be tested has been stored in the medical data system. In this case, the animal information of the animal to be tested may be queried and obtained from the medical data system directly based on an identification number (for example, an ID number) of the animal to be tested.

It can be seen that the animal information is directly obtained from the case data information, so that repetitive operations of ultrasound examination can be further reduced, thereby further improving the examination efficiency of ultrasound examination. It should be understood that obtaining the animal type and the examination type from the case data information is merely an example, and is not intended to limit the obtained data. In step S210, any information, such as an animal weight and an animal age, required by the user can also be obtained.

In some embodiments, the animal information can also be obtained in combination with the above two methods. To be specific, at least part of the animal information can be obtained from the user input information, and at least part of the animal information can be obtained from the case data information. For example, as shown in FIGS. 3 and 4, the user may obtain basic information from the case data information, and input other information on the sub-page of the examination type. As shown in FIG. 3, the user may obtain basic information from the case data information, namely the animal type is cat, and manually select an abdominal examination, and manually input other animal information, such as an animal weight and an animal height, on the sub-page of the abdominal examination. As shown in FIG. 4, similarly, the user may obtain basic information from the case data information, namely the animal type is cat, and manually select a reproductive examination and manually input at least one piece of other animal information of a number of fetuses, a last menstrual period (LMP), a number of pregnancies, a number of abortions, a number of parturitions, and a number of abnormal pregnancies on a sub-page of the reproductive examination.

Optionally, in step S220, determining currently available probes and supported examination modes includes:
  detecting current connection statuses of all probes and determining probes that have been connected as the available probes; and
  obtaining the supported examination modes based on a preset mapping relationship between probes and examination modes.

The ultrasound imaging apparatus may be configured with one or more ultrasonic probes for selection by the user. Because the ultrasonic probe is used very frequently, there may be various problems, for example, abnormal connection such as disconnection. As a result, the configured ultrasonic probe is not always available. In conventional veterinary ultrasound examination, a probe manually selected by the user is very likely to be unavailable and the user needs to make another selection, which increases user operations and repetitive work and reduces the examination efficiency. According to the embodiments of the disclosure, before the target probe suitable for the animal to be tested is automatically determined, by detecting whether all probes are available, the selection range of probes may be further narrowed down, to more quickly obtain a suitable probe for examination.

In some embodiments, detecting current connection statuses of all probes may include: detecting connection statuses of connection slots of all the probes. Specifically, the connection slots of all the probes are sequentially detected, and if it is detected that a probe is connected to a current connection slot, a model of the probe is obtained and the probe is used as an available probe. If it is detected that no probe is connected to a current connection slot, a next probe is detected until models of all probes connected to connection slots are obtained.

Further, in some embodiments, each available probe may be displayed in association with a number of a connection slot corresponding thereto. This facilitates the user in directly and quickly finding a corresponding probe for ultrasound examination based on a number of a connection slot, thereby further reducing the workload of the user and improving the efficiency of ultrasound examination.

In some embodiments, the method 200 may further include: setting a preset mapping relationship between probes and examination modes.

The preset mapping relationship between probes and examination modes may be factory setting of the ultrasound imaging apparatus, or may be set or modified by a user. Each available probe and an examination mode supported thereby can be directly and quickly obtained based on the preset mapping relationship between probes and examination modes.

Figure 5:
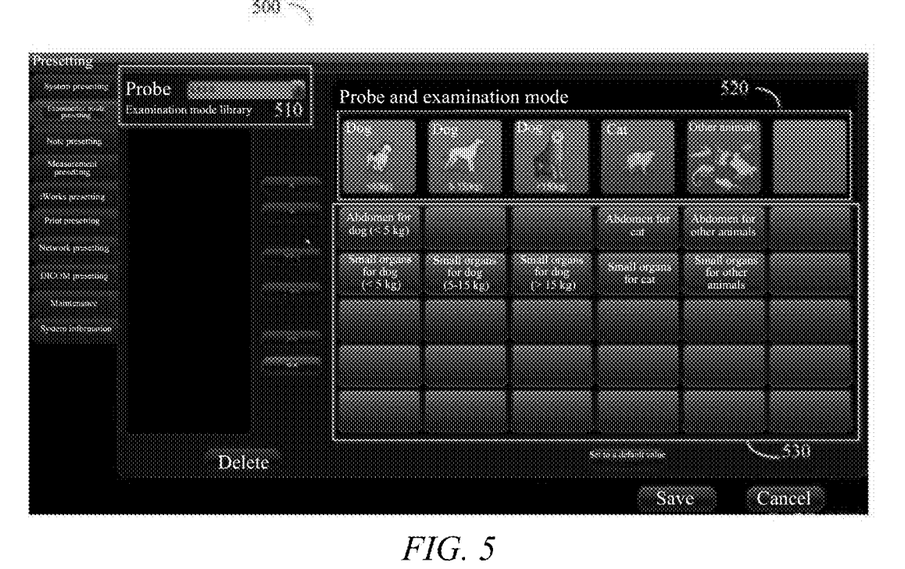
FIG. 5 shows an example of a preset mapping relationship according to an embodiment of the disclosure.

FIG. 5 shows a setting example of a preset mapping relationship according to an embodiment of the disclosure. As shown in FIG. 5, the human-machine interaction device may provide a corresponding setting interface of the preset mapping relationship to a user through a display device (for example, a display). The setting interface 500 of the preset mapping relationship may include:

A probe model option 510, wherein a probe model may be changed by selecting content in the model option 510.

Animal type identifiers 520, which are used to identify different animal types in an intuitive picture form and/or text form, and may be located in one row. Animal types may also be set by a user, for example, may be set only according to animal categories, such as dog, cat and horse, as required; or more detailed classification settings may also be made according to animal categories and animal weights as shown in FIG. 5, for example, dog <5 (kg), dog 5-15 (kg), dog >15 (kg), cat, and other animals.

Examination mode identifiers 530, which are located in the same column as corresponding animal type identifiers 520 and used to identify examination modes corresponding to the animal type identifiers 520 in the column. As shown in FIG. 5, in a column of dog <5 (kg), there are two examination mode identifiers, i.e., abdomen and small organ. In this case, the examination mode identifiers indicate an abdomen examination mode for dog <5 (kg) and a small organ examination mode for dog <5 (kg).

Referring to FIG. 5, a user may select a probe model L13-3 of a probe to be set in the probe model option 510 through an input device (for example, a mouse, a keyboard, or a touch screen), and set, in the examination mode identifiers 530, examination modes available for examination by the L13-3 probe, for example, an abdomen examination mode for dog <5 (kg), a small organ examination mode for dog <5 (kg), a small organ examination mode for dog 5-15 (kg), a small organ examination mode for dog >15 (kg), a abdomen examination mode for cat, a small organ examination mode for cat, an abdomen examination mode for other animals, and a small organ examination mode for other animals. The user may store the above settings, to complete the setting of a preset mapping relationship between the probe model L13-3 and the examination modes thereof. Similarly, the user may also set a preset mapping relationship for probes of other models. It should be understood that the user may also modify the preset mapping relationship as required.

Optionally, the method further includes:
collecting statistics on at least one of a usage frequency, a total number of usage times, and a total usage duration of each examination mode supported by each probe, to obtain historical usage data of each probe.

A usage status of a probe during actual usage of an ultrasound apparatus may reflect usage habits of users. During usage, for an examination type for a certain type of animals, users may frequently use a probe model that the users think has a good examination effect, to perform examination, and both a usage frequency and a usage duration of the probe increase accordingly. Therefore, collecting statistics on usage statuses of a probe and each examination mode supported by the probe can facilitate users in quickly determining a suitable probe by using a principle of statistics during an actual operation, which ensures the effect of ultrasound examination and provides great convenience for users unfamiliar or less experienced with the ultrasound apparatus.

In some embodiments, the usage frequency of each examination mode supported by each probe may include: a number of times each examination mode supported by each probe is used within a preset time period. For example, the preset time period may be a week, a month, a quarter, etc., and statistics on a number of times each examination mode for each probe is used within a month may be collected as the usage frequency of each examination mode for the probe.

In some embodiments, the total number of usage times of each examination mode supported by each probe may include: an cumulative number of usage times of each examination mode supported by each probe.

Further, in the above embodiment, when a time for an examination mode used by a probe reaches a first preset duration, it may be considered that the examination mode for the probe is used once. Upon performing a particular type of ultrasound examination on an animal, a user may switch a currently used probe and an examination mode for the probe that the user thinks are undesirable. If the currently used probe and the examination mode for the probe are also included in statistics collection, this may have a noise impact on statistical data and is not conducive to the accuracy of automatically determining a probe. Therefore, only after the time for the examination mode used by the probe reaches the first preset duration, the probe and the examination mode for the probe are included in statistics collection, which can more accurately reflect the actual usage and help determine a more suitable probe.

In some embodiments, the first preset duration may be 1 minute. It should be understood that the first preset duration may be set as required, which is not limited herein.

Optionally, in step S230, determining, based on the animal information and historical usage data of the available probes, a target probe for examining the animal to be tested are determined from the available probes and a target examination mode for examining the animal to be tested are determined from examination modes that supported by each of the available probes includes:
determining candidate target probes based on the animal information; and
selecting, from examination modes supported by the candidate target probes, an examination mode with the highest usage frequency, the largest total number of usage times or the longest total usage duration as the target examination mode, wherein a candidate target probe corresponding to the target examination mode is the target probe; or calculating, based on weights of at least two of a usage frequency, a total number of usage times and a total usage duration, scores of examination modes supported by the candidate target probes, and using an examination mode with the highest score as the target examination mode, wherein a candidate target probe corresponding to the target examination mode is the target probe.

In some embodiments, there may be one or more candidate target probes.

In some embodiments, the candidate target probes may be determined based on the animal type in the animal information. An animal body size may be determined according to the animal type, and for different animal body sizes, different image effects are obtained by different probes. Therefore, probes suitable for the animal body size may be selected from the available probes as the candidate target probes. For example, a micro-convex array probe may be suitable for smaller animals instead of larger animals. Therefore, when the animal type of the animal to be tested is a large animal such as a horse, the micro-convex array probe may be excluded, and other available probes may be used as candidate target probes for examining a horse. Further, because animals of the same type have similar examination types, for example, some examination types are mandatory, an examination frequency of such an examination type is higher, and a usage frequency, a total number of usage times, or a total usage duration of a corresponding examination mode used for the examination is also higher accordingly. In this case, an examination mode with the highest usage frequency, the largest total number of usage times or the longest total usage duration is selected, from examination modes supported by the candidate target probes, as the target examination mode, and a probe corresponding to the target examination mode is the target probe.

In some embodiments, the candidate target probes may be determined based on the examination type in the animal information. As described above, each available probe can support one or more examination modes. Therefore, an examination mode for a probe may be determined based on the examination type of the animal to be tested, so that available probes that support the examination mode may be selected as the candidate target probes according to the examination mode. Then, an examination mode with the highest usage frequency, the largest total number of usage times or the longest total usage duration, and a probe corresponding to the examination mode are selected, from the candidate target probes, as the target examination mode and the target probe.

In some embodiments, the candidate target probes may also be determined based on the animal type and the examination type in the animal information. An animal body size may be determined according to the animal type, and an examination mode for a probe may be determined according to the examination type. Therefore, probes that are suitable for the animal body size and support the examination mode may be selected, from the available probes, as the candidate target probes. Then, an examination mode with the highest usage frequency, the largest total number of usage times or the longest total usage duration, and a probe corresponding to the examination mode are selected, from the candidate target probes, as the target examination mode and the target probe.

In some embodiments, the target examination mode and the target probe may be determined either based on only one of the usage frequency, the total number of usage times and the total usage duration in the above embodiments, or based on a combination of at least two of the usage frequency, the total number of usage times and the total usage duration. Specifically, a respective weight of the usage frequency, the total number of usage times or the total usage duration may be set, and scores are provided depending on whether the usage frequency, the total number of usage times or the total usage duration falls within a corresponding preset range, which may be preset ranges at a plurality of levels. For example, if the usage frequency falls within a first preset range, a score of the usage frequency is S1, if the usage frequency falls within a second preset range, a score of the usage frequency is S2, and so on. Similarly, the total number of usage times or the total usage duration may also be scored according to respective corresponding preset ranges at different levels. Then, scores of at least two of the usage frequency, the total number of usage times and the total usage duration are multiplied by their respective weights and then added, to obtain a score of an examination mode. Scores of all examination modes for the candidate target probes are compared, an examination mode with the highest score is selected as the target examination mode, and a candidate target probe corresponding to the target examination mode is the target probe.

It should be understood that the respective corresponding preset ranges at different levels of the usage frequency, the total number of usage times and the total usage duration and corresponding scores thereof, and the weights of the usage frequency, the total number of usage times and the total usage duration may all be set as required, which are not limited herein.

Optionally, in step S230, determining, based on the animal information and historical usage data of the available probes, a target probe for examining the animal to be tested are determined from the available probes and a target examination mode for examining the animal to be tested are determined from examination modes that supported by each of the available probes includes:

determining the target examination mode based on the animal information;

selecting, from the available probes that support the target examination mode, an available probe with the highest usage frequency, the largest total number of usage times or the longest total usage duration as the target probe; or calculating, based on weights of at least two of a usage frequency, a total number of usage times and a total usage duration, scores of the available probes that support the target examination mode, and using an available probe with the highest score as the target probe.

The target examination mode may be directly determined according to the examination type in the animal information. Then, based on at least one of the usage frequency, the total number of usage times and the total usage duration, the target probe is determined from the available probes that support the target examination mode. The target probe may be an available probe with the highest usage frequency, the largest total number of usage times or the longest total usage duration, or may be an available probe determined by comprehensive consideration of at least two of the usage frequency, the total number of usage times and the total usage duration. Calculation of a score of an available probe based on the weights of at least two of the usage frequency, the total number of usage times and the total usage duration is similar to the calculation in the above embodiments, which is not repeated herein.

Optionally, in step S230, determining, based on the animal information and historical usage data of the available probes, a target probe for examining the animal to be tested are determined from the available probes and a target examination mode for examining the animal to be tested are determined from examination modes that supported by each of the available probes includes:

determining the target examination mode based on the animal information;

using available probes that have appeared in the historical usage data of the available probes and support the target examination mode as candidate target probes;

receiving a first user instruction; and determining the target probe from the candidate target probes in response to the first user instruction.

After the target examination mode is determined based on the animal information, probes having been used by the user for the target examination mode may be selected as the candidate target probes in combination with the historical usage data of the available probes. In this case, the human-machine interaction device may present identifiers of the candidate target probes to the user through a display device, for selection by the user. The user selects, through an input device, an identifier of a probe that the user considers suitable, and the input device sends the first user instruction to a processor. After receiving the first user instruction, the processor uses the candidate target probe corresponding to the identifier selected by the user as the target probe in response to the first user instruction. This facilitates the user in making a selection according to his/her needs, which increases the flexibility of ultrasound examination.

Optionally, the method includes: displaying a recently used list, which includes at least one combined identifier arranged according to a usage time, wherein each combined identifier includes a corresponding probe identifier, an animal type and examination mode identifier.

A display device of the human-machine interaction device may display, on an operation interface, on which animals the user recently performs ultrasound examination by using which probes and examination modes. When the target probe determined by the processor is not the one that the user desires, the user can quickly switch a probe based on a recently used examination condition, which can further reduce the steps and time of the manual operation of the user and improve the working efficiency.

Optionally, after the target probe and the target examination mode for examining the animal to be tested are determined in step S230, the target probe may be controlled to perform ultrasound scanning on the animal to be tested under the target examination mode. For example, the target probe is controlled to transmit an ultrasonic wave to the animal to be tested and receive an echo of the ultrasonic wave, to obtain an ultrasonic echo signal, and the ultrasonic echo signal is processed to obtain an ultrasound image or an ultrasound-related parameter of the animal to be tested.

Figure 6:
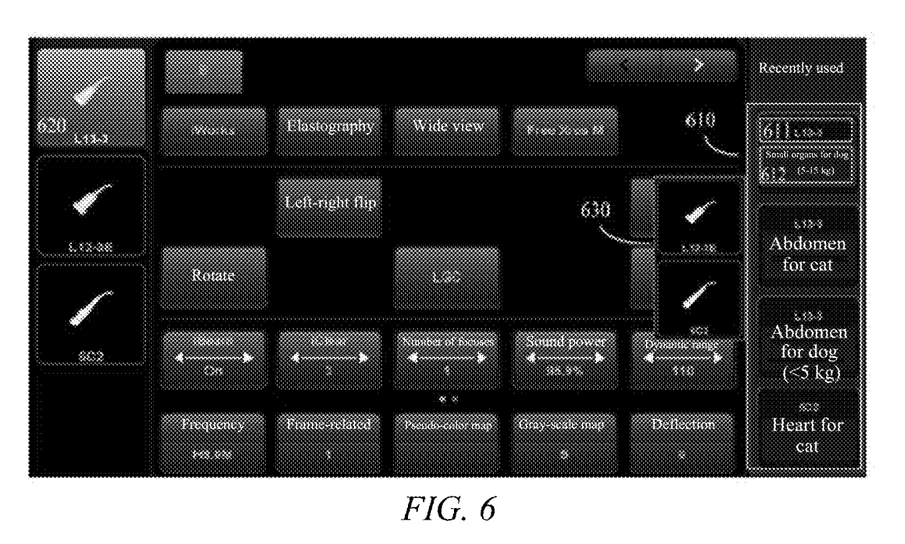
FIG. 6 shows an example of an operation interface including a recently used list according to an embodiment of the disclosure.

FIG. 6 shows an example of an operation interface including a recently used list according to an embodiment of the disclosure. As shown in FIG. 6, the recently used list may be provided in a right edge area of the operation interface. The recently used list includes at least one combined identifier 610, and each combined identifier includes a corresponding probe identifier 611 and an animal type and examination mode identifier 612. The probe identifier 611 may be used to identify a probe model, and the animal type and examination mode identifier 612 may be used to identify an animal type and an examination mode used by a probe. Combined identifiers 610 may be arranged in a column in chronological order. For example, a combined identifier in the first row indicates a probe and an examination mode therefor that are most recently used currently, a combined identifier in the second row indicates a probe and an examination mode therefor that are used at a longer time interval from a current time than that in the first row, and so on. As shown in FIG. 6, the combined identifier in the first row may indicate that the last ultrasound examination is performed on a dog (5-15 kg) under the small organ examination mode based on the probe model L13-3.

It should be understood that the location of the recently used list may be set as required, and is not limited to the location shown in FIG. 6. In addition, the arrangement of the combined identifiers in the recently used list may also be set as required, which is not limited herein.

In some embodiments, the method further includes:

selecting an animal type and examination mode identifier from a combined identifier, and displaying, in an association manner, a probe identifier of another available probe that supports the selected animal type and examination mode; or selecting a probe identifier from a combined identifier, and displaying, in an association manner, a probe identifier of another available probe that supports an animal type and an examination mode in the combined identifier that correspond to the selected probe identifier, wherein when the probe identifier of the another available probe is selected, the another available probe is used as a new target probe to examine the animal to be tested.

Specifically, referring to FIG. 6, the operation interface may further include identifiers of available probes. A current probe 620 may also be prominently displayed (for example, highlighted). When the user is not satisfied with the currently determined or used probe, the user may operate the combined identifier in the recently displayed list. In some embodiments, an animal type and examination mode identifier in a combined identifier may be selected, for example, "dog (5-15 kg) small organ" in the combined identifier in the first row, and then "dog (5-15 kg) small organ" may be used as a new target examination mode. The operation interface may display, in an association manner, probe identifiers 630 of other available probes, such as probes L12-3E and 6C2, that support the selected animal type and examination mode "dog (5-15 kg) small organ". The user may continue to perform selection from the probe identifiers 630 of other available probes. According to a probe identifier of another available probe selected by the user, a current probe may be switched to the another available probe selected by the user as a new target probe, to examine the animal to be tested, thereby enabling the user to quickly switch a probe and an examination mode corresponding thereto. In some embodiments, a probe identifier in a combined identifier may also be selected, for example, "L13-3" in the combined identifier in the first row. In this case, "dog (5-15 kg) small organ" corresponding to "L13-3" in the combined identifier in the first row may be used as a new target examination mode, and the probe identifiers 630 of other available probes, such as the probes L12-3E and 6C2, that support "dog (5-15 kg) small organ" are displayed in an association manner. The user may continue to perform selection from the probe identifiers 630 of the other available probes, and according to a probe identifier of another available probe selected by the user.

Figure 7:
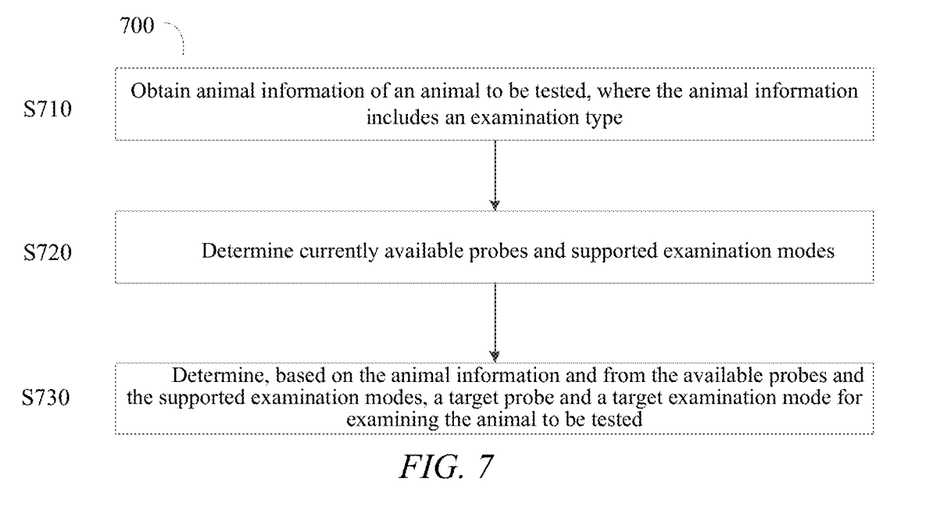
FIG. 7 is a schematic flowchart of a method for determining a veterinary ultrasound examination condition according to an embodiment of the disclosure.

According to an embodiment of the disclosure, a method for determining a veterinary ultrasound examination condition is further provided. FIG. 7 is a schematic flowchart of a method for determining a veterinary ultrasound examination condition according to an embodiment of the disclosure. As shown in FIG. 7, the method 700 includes:

step S710 of obtaining animal information of an animal to be tested, wherein the animal information includes an examination type;

step S720 of determining currently available probes and supported examination modes; and step S730 of determining, based on the animal information, a target probe and a target examination mode for examining the animal to be tested from the available probes and the supported examination modes.

The examination mode for the probe may be determined according to the examination type in the animal information, and the target probe and thus the target examination mode may be determined from the available probes that support the examination mode.

It should be understood that steps S710 and S720 may be performed synchronously, or may be performed asynchronously, and step S720 may also be completed before step S710. The sequence of steps S710 and S720 is not limited herein. In addition, implementation processes of steps S710 and S720 may be at least partially the same as those of steps S210 and S220 shown in FIG. 2, respectively.

In some embodiments, there may be one or more available probes that support the examination mode. If there is one available probe that supports the examination mode, the available probe is directly used as the target probe, and the examination mode is the target examination mode. If there are a plurality of available probes that support the examination mode, the user may make a further selection therefrom.

Optionally, in step S730, determining, based on the animal information, a target probe and a target examination mode for examining the animal to be tested from the available probes and the supported examination modes includes:

determining the target examination mode based on the examination type;

using available probes that support the target examination mode as candidate target probes;

receiving a second user instruction; and determining the target probe from the candidate target probes in response to the second user instruction.

Specifically, a processor obtains the examination type from the animal information of the animal to be tested, so as to determine the target examination mode; available probes that support the target examination mode can be obtained as the candidate target probes according to a preset mapping relationship between probes and examination modes; the human-machine interaction device may present identifiers of the candidate target probes to the user through a display device, for selection by the user; and the user selects, through an input device, an identifier of a probe that the user considers suitable, and the input device sends the second user instruction to a processor. After receiving the second user instruction, the processor uses the candidate target probe corresponding to the identifier selected by the user as the target probe in response to the second user instruction. In this way, the flexibility of ultrasound examination is increased.

In some embodiments, the animal information further includes an animal type, and using available probes that support the target examination mode as candidate target probes further includes:

using available probes that match the animal type in the available probes that support the target examination mode, as the candidate target probes.

A further selection may also be performed from the available probes that support the target examination mode based on the animal type, to obtain available probes that not only support the target examination mode but also match the animal type, as the candidate target probes. In this case, there may be one or more candidate target probes. If there is one candidate target probe, the candidate target probe is directly used as the target probe. If there are a plurality of candidate target probes, the user may make a further selection therefrom.

Optionally, after the target probe and the target examination mode for examining the animal to be tested are determined in step S730, the target probe may be controlled to perform ultrasound scanning on the animal to be tested in the target examination mode. For example, the target probe is controlled to transmit an ultrasonic wave to the animal to be tested and receive an echo of the ultrasonic wave, to obtain an ultrasonic echo signal, and the ultrasonic echo signal is processed to obtain an ultrasound image or an ultrasound-related parameter of the animal to be tested.

According to the method for determining a veterinary ultrasound examination condition, and the ultrasound imaging apparatus in the embodiments of the disclosure, in combination with information of the currently available probes of the ultrasound imaging apparatus and the animal information of the animal to be tested, the probe for examining the animal to be tested is automatically determined, such that repetitive work of a user can be reduced, and a suitable probe for examination can be quickly obtained, thereby improving the examination efficiency of veterinary ultrasound examination, and ensuring the examination effect.

Those skilled in the art should understand that, in addition to the case where features are mutually exclusive, any combination may be used to combine all the features disclosed in this description (along with the appended claims, abstract, and drawings) and all the processes or units of any of methods or apparatuses as disclosed. Unless explicitly stated otherwise, each feature disclosed in this description (along with the appended claims, abstract, and drawings) may be replaced by an alternative feature that provides the same, equivalent, or similar objective.

In addition, those skilled in the art should understand that although some of the embodiments described herein include some but not other features included in other embodiments, combinations of features of different embodiments are meant to be within the scope of the disclosure, and form different embodiments. For example, in the claims, any one of the embodiments set forth thereby may be used in any combination.

The technical terms used in the embodiments of the disclosure are only used to describe specific embodiments and are not intended to limit the disclosure. In this specification, the singular forms "a", "the", and "said" are used to include the plural forms at the same time, unless the context clearly indicates otherwise. Further, the term "comprise" and/or "include" used in the description refers to the presence of the described features, entities, steps, operations, elements, and/or components, but does not exclude the presence or addition of one or more other features, entities, steps, operations, elements, and/or components.

Corresponding structures, materials, actions, and equivalents (if any) of all devices or steps and functional elements in the appended claims are intended to include any structure, material, or action for performing the function in combination with other explicitly required elements. The description of the disclosure is given for the purpose of embodiment and description, but is not intended to be exhaustive or to limit the disclosure to the disclosed form. Many modifications and changes are apparent to those of ordinary skill in the art without departing from the scope and spirit of the disclosure. The embodiments described in the disclosure can better reveal the principles and practical applications of the disclosure, and enable those skilled in the art to understand the disclosure.

The flowchart described in the disclosure is only an embodiment, and there may be various modifications and changes to this illustration or the steps in the disclosure without departing from the spirit of the disclosure. For example, these steps may be performed in a different order, or some steps may be added, deleted, or modified. Those of ordinary skill in the art can understand that all or some of the processes for implementing the foregoing embodiments and equivalent changes made in accordance with the claims of the disclosure still fall within the scope of the disclosure.

What is claimed is:

1. An ultrasound imaging apparatus, comprising:
    an ultrasonic probe;
    a transmitting/receiving control circuit configured to control the ultrasonic probe to transmit an ultrasonic wave to an animal to be tested and receive an echo of the ultrasonic wave, to obtain an ultrasonic echo signal;
    a human-machine interaction device configured to output visual information and receive a user input; and
    a processor configured to perform the method comprising:
        obtaining animal information of an animal to be tested, wherein the animal information comprises an animal type and/or an examination type;
        determining currently available probes and examination modes that supported by each of the available probes; and
        automatically determining, based on the animal information and historical usage data of the available probes, a target probe for examining the animal to be tested, wherein the target probe is determined from the available probes and a target examination mode for examining the animal to be tested is determined from examination modes that are supported by each of the available probes,
    wherein the animal information further comprises an animal weight and/or an animal age, and wherein the animal weight and/or the animal age is used by the processor in determining the target probe for examining the animal to be tested.

2. The ultrasound imaging apparatus of claim 1, wherein obtaining animal information of an animal to be tested comprises:
    obtaining the animal information from user input information or case data information.

3. The ultrasound imaging apparatus of claim 1, wherein determining currently available probes and examination modes that are supported by each of the available probes:
    detecting current connection statuses of all probes and determining probes that have been connected as the available probes; and
    obtaining the examination modes that are supported by each of the available probes based on a preset mapping relationship between probes and examination modes.

4. The ultrasound imaging apparatus of claim 1, further comprising:
    collecting statistics on at least one of a usage frequency, a total number of usage times, and a total usage duration of each of the examination modes supported by each of the probes, to obtain historical usage data of each of the probes.

5. The ultrasound imaging apparatus of claim 1, wherein determining, based on the animal information and historical usage data of the available probes, a target probe for examining the animal to be tested is determined from the available probes and a target examination mode for examining the animal to be tested is determined from examination modes that are supported by each of the available probes comprises:
    determining the target examination mode based on the animal information; and
    selecting, from the available probes that support the target examination mode, an available probe with the highest usage frequency, the largest total number of usage times or the longest total usage duration as the target probe; or
    calculating, based on weights of at least two of a usage frequency, a total number of usage times and a total usage duration, scores of the available probes that support the target examination mode, and using an available probe with the highest score as the target probe.

6. The ultrasound imaging apparatus of claim 1, wherein determining, based on the animal information and historical usage data of the available probes, a target probe for examining the animal to be tested is determined from the available probes and a target examination mode for examining the animal to be tested is determined from examination modes that are supported by each of the available probes comprises:
    determining the target examination mode based on the animal information;
    using available probes that have appeared in the historical usage data of the available probes and support the target examination mode as candidate target probes;
    receiving a first user instruction; and
    determining the target probe from the candidate target probes in response to the first user instruction.

7. The ultrasound imaging apparatus of claim 1, further comprising: displaying a recently used list, which comprises at least one combined identifier arranged according to a usage time, wherein each combined identifier comprises a corresponding probe identifier and an animal type and examination mode identifier.

8. The ultrasound imaging apparatus of claim 7, further comprising:
    selecting an animal type and examination mode identifier from a combined identifier, and displaying, in an association manner, a probe identifier of another available probe that supports the selected animal type and examination mode; or
    selecting a probe identifier from a combined identifier, and displaying, in an association manner, a probe identifier of another available probe that supports an animal type and an examination mode in the combined identifier that corresponds to the selected probe identifier,
    wherein when the probe identifier of the another available probe is selected, the another available probe is used as a new target probe to examine the animal to be tested.

9. The ultrasound imaging apparatus of claim 1, further comprising:

controlling the target probe to perform ultrasound scanning on the animal to be tested under the target examination mode.

10. The ultrasound imaging apparatus of claim 1, wherein determining, based on the animal information and historical usage data of the available probes, a target probe for examining the animal to be tested is determined from the available probes and a target examination mode for examining the animal to be tested is determined from examination modes that are supported by each of the available probes comprises:
   determining the target examination mode based on the examination type;
   using available probes that support the target examination mode as candidate target probes;
   receiving a second user instruction; and
   determining the target probe from the candidate target probes in response to the second user instruction.

11. An ultrasound imaging apparatus, comprising:
An ultrasound imaging apparatus, comprising:
an ultrasonic probe;
a transmitting/receiving control circuit configured to control the ultrasonic probe to transmit an ultrasonic wave to an animal to be tested and receive an echo of the ultrasonic wave, to obtain an ultrasonic echo signal;
a human-machine interaction device configured to output visual information and receive a user input; and
a processor configured to perform the method comprising:
   obtaining animal information of an animal to be tested, wherein the animal information comprises an animal type and/or an examination type;
   determining currently available probes and examination modes that are supported by each of the available probes; and
   automatically determining, based on the animal information and historical usage data of the available probes, a target probe for examining the animal to be tested, wherein the target probe is determined from the available probes and a target examination mode for examining the animal to be tested is determined from examination modes that are supported by each of the available probes,
wherein determining includes:
   determining candidate target probes based on the animal information; and
   calculating, based on weights of at least two of a usage frequency, a total number of usage times and a total usage duration, scores of examination modes supported by the candidate target probes, and using an examination mode with the highest score as the target examination mode, wherein a candidate target probe corresponding to the target examination mode is the target probe.

* * * * *